(12) United States Patent
Breyta et al.

(10) Patent No.: US 12,319,792 B2
(45) Date of Patent: *Jun. 3, 2025

(54) RECYCLING PROCESS FOR THE RECOVERY OF COTTON FROM POLYESTER-COTTON FABRICS AND/OR FIBERS

(71) Applicant: TACLOV, LLC, Armonk, NY (US)

(72) Inventors: Gregory Breyta, San Jose, CA (US); Robert David Allen, Golden, CO (US)

(73) Assignee: TACLOV, LLC., Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,744

(22) Filed: Sep. 11, 2023

(65) Prior Publication Data

US 2023/0416492 A1 Dec. 28, 2023

Related U.S. Application Data

(63) Continuation of application No. 17/525,789, filed on Nov. 12, 2021, now Pat. No. 11,787,917.

(60) Provisional application No. 63/120,330, filed on Dec. 2, 2020.

(51) Int. Cl.
| | | |
|---|---|---|
| *C08J 11/02* | (2006.01) | |
| *C08J 11/28* | (2006.01) | |
| *D06M 13/325* | (2006.01) | |
| *D06M 13/342* | (2006.01) | |
| *D06M 101/06* | (2006.01) | |

(52) U.S. Cl.
CPC .............. *C08J 11/28* (2013.01); *C08J 11/02* (2013.01); *D06M 13/325* (2013.01); *D06M 13/342* (2013.01); *C08J 2301/02* (2013.01); *C08J 2367/02* (2013.01); *D06M 2101/06* (2013.01)

(58) Field of Classification Search
USPC ......................................................... 521/48
See application file for complete search history.

(56) References Cited

U.S. PATENT DOCUMENTS

| | | | |
|---|---|---|---|
| 3,284,348 | A | 11/1966 | Hutton |
| 3,666,791 | A | 5/1972 | Chikawa et al. |
| 3,668,235 | A | 6/1972 | Ichikawa et al. |
| 3,691,092 | A | 9/1972 | Floria |
| 4,003,880 | A | 1/1977 | Sidebotham et al. |
| 4,003,881 | A | 1/1977 | Sidebotham et al. |
| 4,064,079 | A | 12/1977 | Sidebotham et al. |
| 4,118,187 | A | 10/1978 | Sidebotham et al. |
| 4,137,393 | A | 1/1979 | Sidebotham et al. |
| 7,030,264 | B1 | 4/2006 | Inada et al. |
| 7,211,193 | B2 | 5/2007 | Inada et al. |
| 9,255,194 | B2 | 2/2016 | Allen et al. |
| 9,914,816 | B2 | 3/2018 | Allen et al. |
| 11,787,917 | B2 | 10/2023 | Breyta |
| 2004/0182782 | A1 | 7/2004 | Inada et al. |
| 2015/0105532 | A1 | 4/2015 | Allen |
| 2015/0232632 | A1 | 8/2015 | Walker |
| 2017/0218162 | A1 | 8/2017 | Walker |
| 2019/0345306 | A1 | 11/2019 | Walker |
| 2020/0262108 | A1 | 8/2020 | Keh et al. |
| 2022/0169824 | A1 | 6/2022 | Breyta |

FOREIGN PATENT DOCUMENTS

| | | |
|---|---|---|
| CN | 102250379 A | 11/2011 |
| CN | 108212210 A | 6/2018 |
| CN | 109467739 A | 3/2019 |
| JP | 2009-173732 A | 8/2009 |
| WO | 2019047176 A1 | 3/2019 |
| WO | 2021032826 A1 | 2/2021 |
| WO | 2022118148 A1 | 6/2022 |

OTHER PUBLICATIONS

Office Action Response to Rule 161(1) dated Nov. 17, 2023, Application No. 21900172.4, 29 pages.
IBM Patents or Patent Applications Treated as Related, Sep. 11, 2023 (pp. 1-2).
International Search Report and Written Opinion for counterpart PCT Application No. PCT/IB2021/060971 dated Mar. 2, 2022 (9 pages).
Anonymous, "About Us", Worn Again Technologies, downloaded from the Internet on Nov. 2, 2023, 8 pages, <https://wornagain.co.uk/about-us/#technology>.
Anonymous, "Axens, IFPEN and JEPLAN join their forces to demonstrate and commercialize an innovative process for the recycling of all types of waste PET", Press Release, Sep. 11, 2020, 3 pages, <https://www.jeplan.co.jp/en/2020/09/11/8794/>.
Anonymous, "Indian-American start-up aims to lead sustainable fashion industry through new chemical recycling process", News India Times, Jan. 2, 2019, 3 pages, <https://www.newsindiatimes.com/indian-american-start-up-aims-to-lead-sustainable-fashion-industry-through-new-chemical-recycling-process/>.

(Continued)

*Primary Examiner* — Terressa Boykin
(74) *Attorney, Agent, or Firm* — Kilpatrick Townsend & Stockton LLP

(57) ABSTRACT

Polyester-free cotton is obtained from a fabric and/or fibers containing polyester and cotton by reacting the fabric and/or fibers with an amine organocatalyst and/or carboxylic acid salt of same and an alcohol solvent. The reaction, which may be run in batches or as a continuous flow process, recovers (i) polyester-free cotton as a solid inert by-product of the reaction, (ii) the amine organocatalyst and/or carboxylic acid salt of same for reuse, (iii) a polyester monomer product, and (iv) unreacted alcohol. The reaction works on any polyester-cotton fabric and/or fibers, including those that have at least one additional material, such as polyethers polyolefins, polyurethanes, nylon, rayon, acetate, viscose, modal, acrylic, wool, and combinations thereof.

19 Claims, 8 Drawing Sheets

(5 of 8 Drawing Sheet(s) Filed in Color)

(56) References Cited

OTHER PUBLICATIONS

Anonymous, "Moral Fiber seeks to close the textile loop through innovative recycling", UN Environment Programme, Jan. 1, 2019, 2 pages, <https://www.unep.org/news-and-stories/story/moral-fiber-seeks-close-textile-loop-through-innovative-recycling>.

Uddin, Mostafiz, "Turning the 'old and worn' into 'new and precious'", The Daily Star, Jul. 7, 2019, 6 pages, <https://www.thedailystar.net/opinion/news/turning-the-old-and-worn-new-and-precious-1767529>.

Intellectual Property Office, "Request for the Submission of an Opinion," Nov. 8, 2024, 16 Pages, KR Application No. 10-2023-7018472.

RECYCLING PROCESS FOR THE RECOVERY OF COTTON FROM POLYESTER-COTTON FABRICS AND/OR FIBERS

TECHNICAL FIELD

The present invention relates generally to recycling processes and more specifically to a depolymerization process for the recovery of cotton from polyester-cotton fabrics and/or fibers.

BACKGROUND OF THE INVENTION

Recycling of polymers is challenging due to the nature of polymers to not tolerate contamination by other material. Foreign, dissimilar polymers, dyes, pigment, dirt, etc., will cause severe degradation of the properties (mechanical, optical, barrier, etc.) during typical recycling processes. Both mechanical recycling and chemical recycling face separate challenges from low quality plastic waste, which is further complicated with textiles (fibers and fabrics). The garment industry coupled with "fast fashion" has provided a highly profitable business in the production of clothing for the increasing population of the world. In fact, more polyester is used for fiber and fabric than for food and beverage packaging, and virtually none is currently recycled. A complication to recycling of fabrics is the preponderance of "blends" used in clothing. Most common are blends of cotton with polyester. Polyblend fabrics refer to polyester/cotton blends of 50/50 or more likely 65/35 where the polyester is the dominant fiber. Attempts to chemically recycle polyester from polyblend fabrics have included digestion and/or dissolution of the polyester component from the polyblend fabric, but both methods result in unusable cotton. With polyester digestion using harsh catalysts (e.g., alkali metal hydroxide base) in the polyester recycling can result in the breaking down of the cotton rendering the latter fabric unusable as recovered. With polyester dissolution, polyester residues are left on the cotton surface rendering the fabric unacceptable for reuse.

SUMMARY OF THE INVENTION

In one aspect, the present invention relates to a method comprising: reacting a fabric and/or fibers comprising polyester and cotton with an amine organocatalyst and/or carboxylic acid salt of same and an alcohol solvent; and recovering (i) polyester-free cotton as a solid inert by-product of the reaction, (ii) the amine organocatalyst and/or carboxylic acid salt of same for reuse, (iii) a polyester monomer product, and (iv) unreacted alcohol solvent.

In another aspect, the present invention relates to a method comprising: reacting a fabric and/or fibers comprising polyethylene terephthalate (PET) and cotton with triethylamine (TEA) and/or a carboxylic salt of same and ethylene glycol (EG); and recovering (i) PET-free cotton as a solid inert by-product of the reaction, (ii) the TEA and/or carboxylic acid salt of same for reuse, (iii) bis(2-hydroxyethyl) terephtalate (BHET), and (iv) unreacted EG.

In a further aspect, the present invention relates to a method comprising: reacting a fabric and/or fibers comprising PET and cotton with TEA and EG in a continuous flow process, wherein the TEA and EG depolymerize the PET in the fabric and/or fibers; and recovering (i) polyester-free cotton as a solid inert by-product of the reaction, (ii) BHET, (iii) the TEA, and (iv) unreacted EG, wherein the TEA and/or the unreacted EG are reused in the continuous flow process for continued depolymerization of newly introduced fabrics and/or fibers.

Additional aspects and/or embodiments of the invention will be provided, without limitation, in the detailed description of the invention that is set forth below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
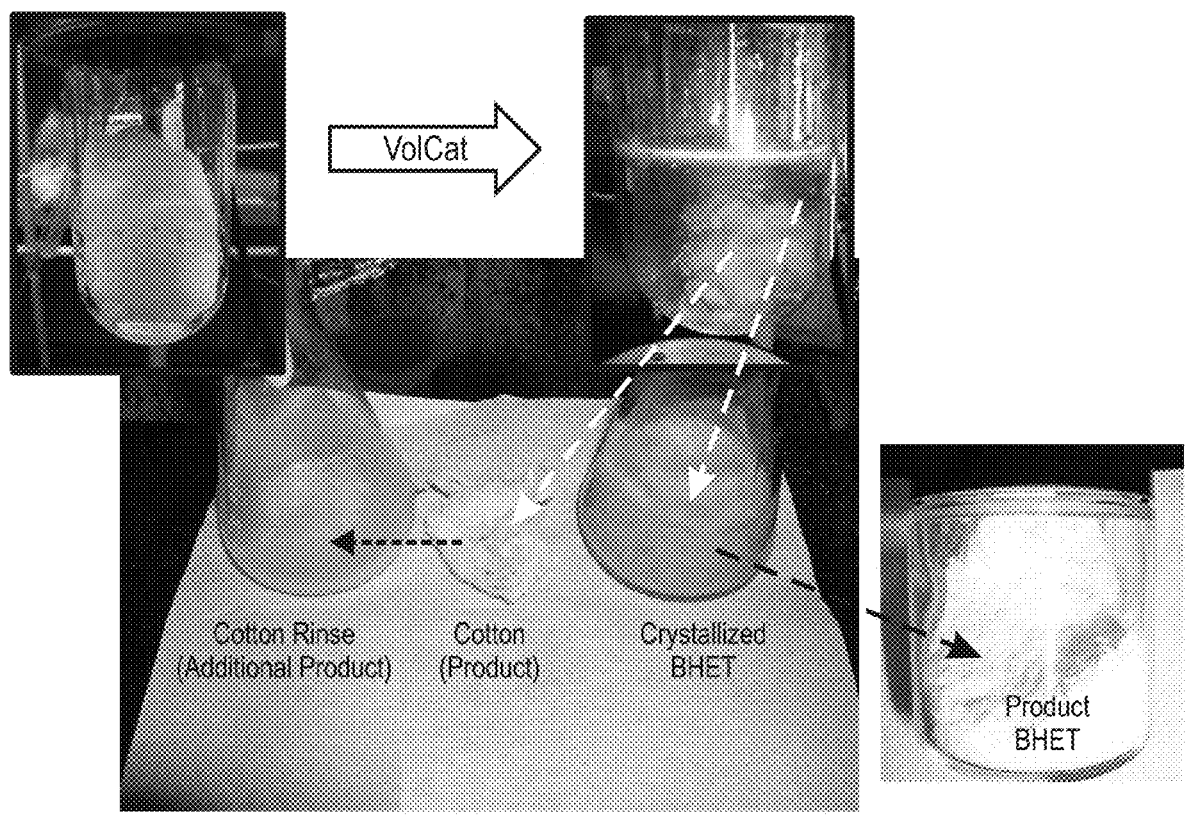
FIG. 1 are photographs showing the results of VolCat (volatile catalyst) depolymerization of a sample of garneted white fibers of ~2.4/97.6 cotton/polyester into a white polyester-free cotton product and crystallized bis(2-hydroxyethyl)terephthalate (BHET) (Example 1).

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "fabric" is used in its conventional sense to refer to a cloth, textile, or pile that is produced by knitting, weaving, or felting fibers.

As used herein, the term "fiber" refers to any natural or synthetic thread, filament, or yarn.

As used herein, the term "polyester-cotton" is used refer to fabrics and/or fibers that have polyester and cotton in no particular percentage and which may include another non-cotton material. Examples of non-cotton materials that may be included in the polyester-cotton fabrics and/or fibers include, without limitation, polyethers, polyolefins, polyurethanes, nylon, rayon, acetate, viscose, modal, acrylic, wool, and combinations thereof.

Described herein is a volatile catalyst (VolCat) process that when applied to a polyester-cotton fabric produces at least two product streams: recycled high quality cotton and a polyester monomer, the latter of which may be used for the subsequent production of a new polyester material (of either bottle or textile quality). VolCat is a gentle and highly selective process that depolymerizes the input polyester component while leaving other components present in the input polyester feedstock intact and recoverable.

The VolCat chemical recycling process is described in U.S. Pat. No. 9,255,194 B2 to Allen et al. and U.S. Pat. No. 9,914,816 B2 to Allen et al. In one embodiment, the VolCat process depolymerizes polyester with an alcohol solvent and an amine organocatalyst and/or carboxylic acid salt of same in a reactor at a temperature at or higher than the boiling point of the alcohol solvent. In another embodiment, the amine organocatalyst and/or carboxylic acid salt of same has a boiling point at least 50° C. lower than the boiling point of the alcohol and the depolymerization is run at a temperature higher than the boiling point of the alcohol solvent. In a further embodiment, the organocatalyst has a boiling point at least 50° C. lower than the boiling point of the alcohol solvent and the depolymerization is run at a temperature higher than the boiling point of the organocatalyst. In another embodiment, the polyester input and the alcohol solvent are heated to a reaction temperature of about 200-250° C. prior to the introduction of the amine organocatalyst and/or carboxylic salt of same. Reaction products from the VolCat depolymerization are monomeric and/or oligomeric diesters from the polyester as well as recovered organocatalyst and excess alcohol solvent, the former of which is intended for reuse into recycled polyester products and the latter of which may also be reused in subsequent depolymerization reactions.

In another embodiment, the VolCat reaction is carried out in a chemical reactor, which may be a pressure reactor, such as an autoclave or extrusion reactor, or a non-pressurized reactor, such as a round bottom flask. In a further embodiment, the depolymerization reaction, which may be pressurized or non-pressurized, as well as one or more optional purification steps for the monomer product are carried out in batches and/or in a continuous flow process. In another embodiment, a solvent in which the monomer product has limited solubility may be used to purify the depolymerized polyester monomer product, whether obtained in a batch process or though continuous flow. Alcohol and/or water are non-limiting examples of such purification solvents. Where an alcohol is used for the purification, the alcohol may be the unreacted alcohol from the depolymerization reaction or a newly introduced clean alcohol. In a further embodiment, the recovered monomer product obtained from the VolCat reaction may be used to produce a new polymer material.

In another embodiment, the polyester is selected from the group consisting of polyethylene terephthalate (PET), polyethylene naphthalate (PEN), polybutylene terephthalate (PBT), polytrimethylene terephthalate (PTI), polyethylene furanoate (PEF), and combinations thereof. In a further embodiment, the alcohol solvent is a glycol and/or diol solvent. In another embodiment, the alcohol solvent is selected from the group consisting of 1,2-ethanediol (ethylene glycol, EG), 1,3-propanediol (trimethylene glycol), 1,4-butanediol (tetramethylene glycol), 1,5-pentanediol (pentylene glycol), and combinations thereof. In a further embodiment, the amine of the amine organocatalyst and/or carboxylic acid salt of same is a tertiary amine. In another embodiment, the amine organocatalyst and/or carboxylic acid salt of same is selected from the group consisting of triethylamine (TEA), tetramethylethylenediamine (TMEDA), pentamethyldiethylenetriamine (PMDETA), trimethyl triaza cyclononane (TACN), 4-(N,N-dimethylamino)pyridine (DMAP), 1,4-diazabicyclo [2.2.2]octane (DABCO), N-methyl imidazole (NMI), and combinations thereof. In a further embodiment, the amine organocatalyst and/or carboxylic acid salt of same is TEA and/or a carboxylic acid salt of same.

In one embodiment, the polyester input comprises a terephthalate and the recovered depolymerized reaction product comprises a terephthalate ester monomer. In another embodiment, the polyester input comprises PET and the recovered polyester monomer product is bis(2-hydroxyethyl)terephthalate (BHET). In a further embodiment, the polyester input comprises PET, the alcohol is EG, the amine organocatalyst is TEA and/or a carboxylic salt of same, and the recovered reaction products comprise unreacted EG, the TEA, and BHET.

When the VolCat process is used on a fabric and/or fibers comprising a polyester-cotton mix, it produces useable recycled cotton in addition to the monomer obtained from the depolymerization of the polyester in the fabric (e.g., BHET from PET). The depolymerized polyester input may be used to produce a new polymer material. Due to the large surface area present in textile fabrics, the VolCat depolymerization reaction proceeds quickly and completely. Upon completion of the reaction, polyester monomers in the fabric and/or fibers are dissolved in the solvent freeing the cotton material from its polyester component and producing solid inert polyester-free cotton as a by-product of the reaction.

Figure 6:
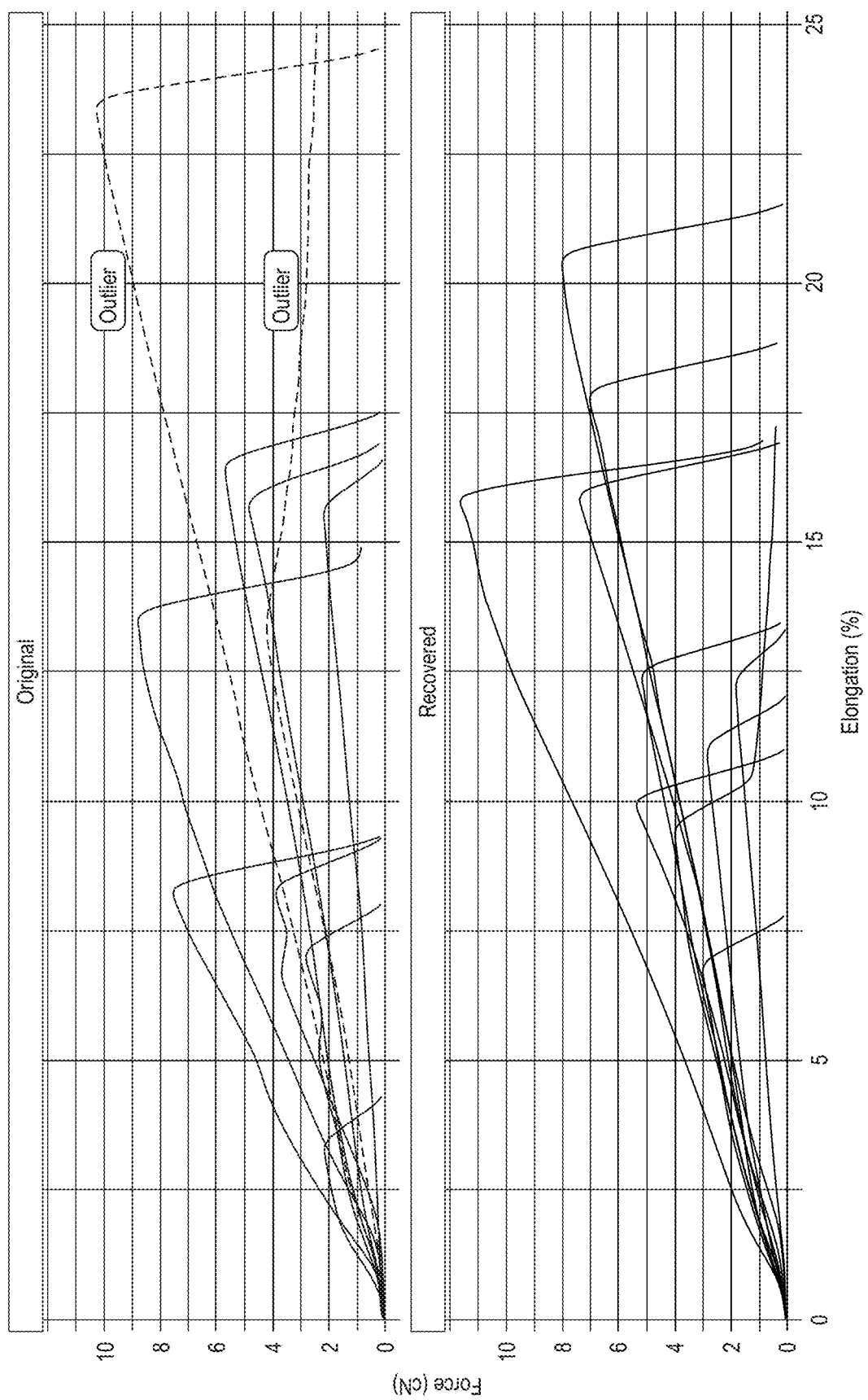
FIG. 6 graphs showing the results of fiber strength testing on individual cotton fibers taken from a white 52/48 cotton/polyester yarn sample before and after VolCat depolymerization (Example 3).
Figure 7:
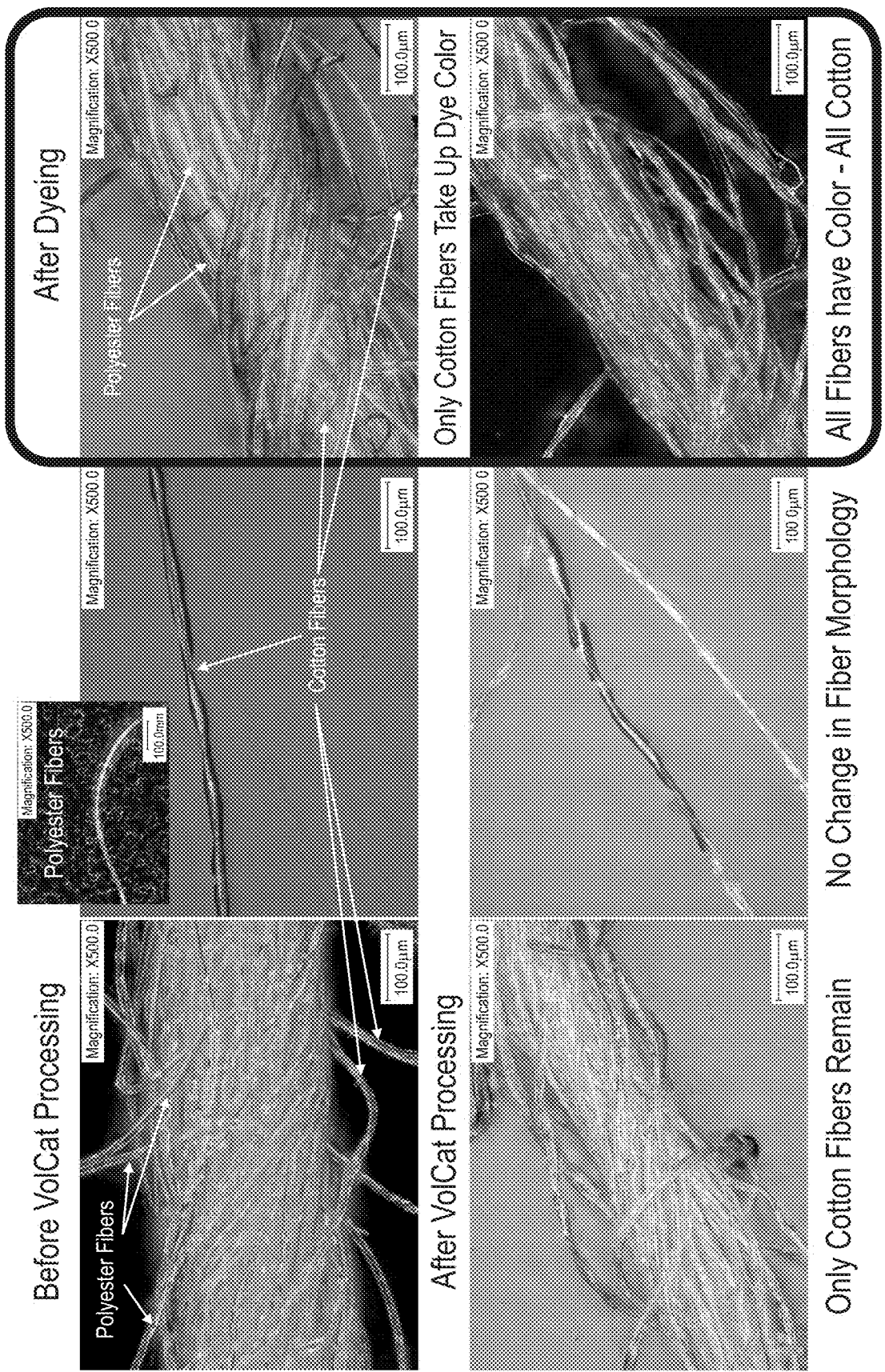
FIG. 7 are micrographs of a white 52/48 cotton/polyester fiber yarn before and after VolCat depolymerization (Example 3).

In one embodiment, the recovered cotton product is purified by washing away any residual monomers remaining on the recovered cotton product following the completion of the VolCat process. The purification may be carried out with a liquid selected from the group consisting of an alcohol, acetone, water, and combinations thereof. Where an alcohol is used for the purification, the alcohol may be the unreacted alcohol from the depolymerization reaction or a newly introduced clean alcohol. The washed cotton may then be dried and recycled. Micrograph analyses of recovered purified cotton show that the structure of the recovered cotton is undamaged, unadulterated, free of polyester, and thus, a useful, high value product of the reaction (FIGS. 6 and 7).

The VolCat process is capable of recycling colored polyester-cotton fabrics and/or fibers into reusable neutral and/or white polyester-free cotton without the use of any harsh chemicals or bleaching. While the VolCat process removes color from the fabric and/or fibers, decolorization and/or purification prior to initiation of the VolCat depolymerization reaction may produce a higher quality recycled fabric upon completion of the reaction. Where a polyester-cotton fabric and/or fibers comprises a material other than cotton, the VolCat process is also capable of fully recovering the non-cotton material provided that the non-cotton material is not polyester-based. Examples of non-polyester/non-cotton materials that may be recovered from the VolCat process includes, without limitation, polyethers, polyolefins, polyurethanes, nylon, rayon, acetate, viscose, modal, acrylic, wool, and combinations thereof.

The following discussion references the depolymerization of fabrics and/or fibers comprising cotton and PET and the recovery of BHET; however, it is to be understood that the discussion is exemplary and not limiting and the depolymerization method described herein may be used on fabrics and/or fibers comprising cotton with other non-cotton materials and/or other polyesters.

The photographs in FIG. 1 show that application of the VolCat process on garneted white fibers of ~2.4/97.6 cotton/polyester results in complete depolymerization of PET, recovery of a white polyester-free cotton fiber product, and crystallized BHET monomer (Example 1).

Figure 2A:
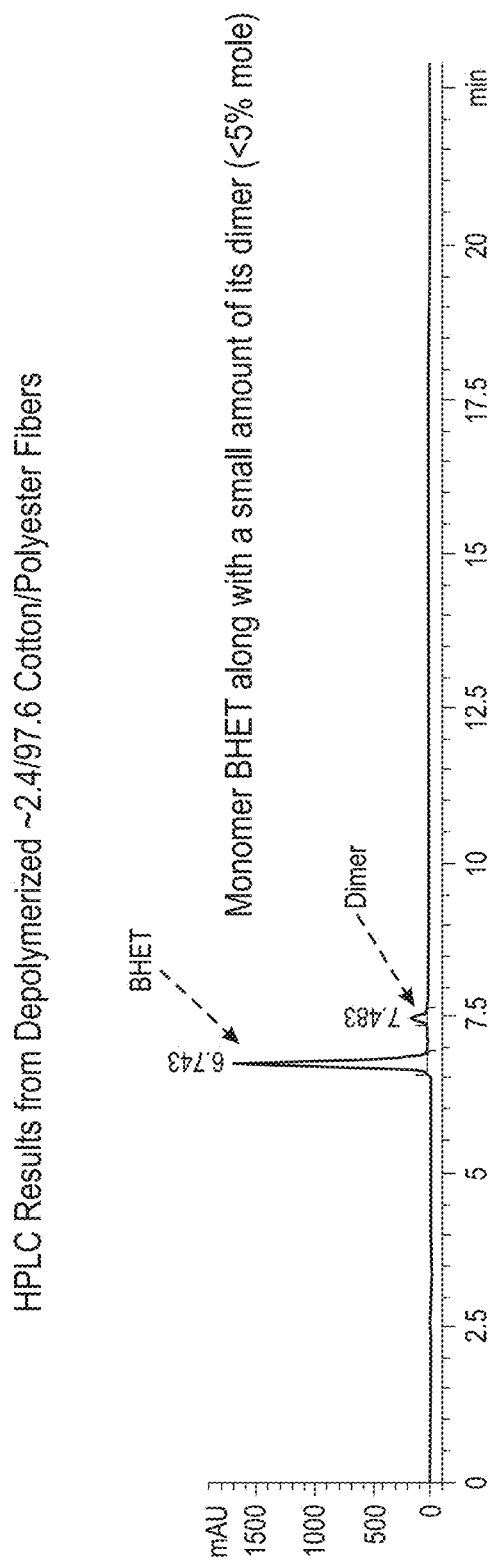
FIG. 2A are HPLC analytic results and FIG. 2B are H-NMR analytic results of the crystallized BHET monomer product obtained from the depolymerization of the polyester portion of the fiber shown in FIG. 1 (Example 1).
Figure 2B:
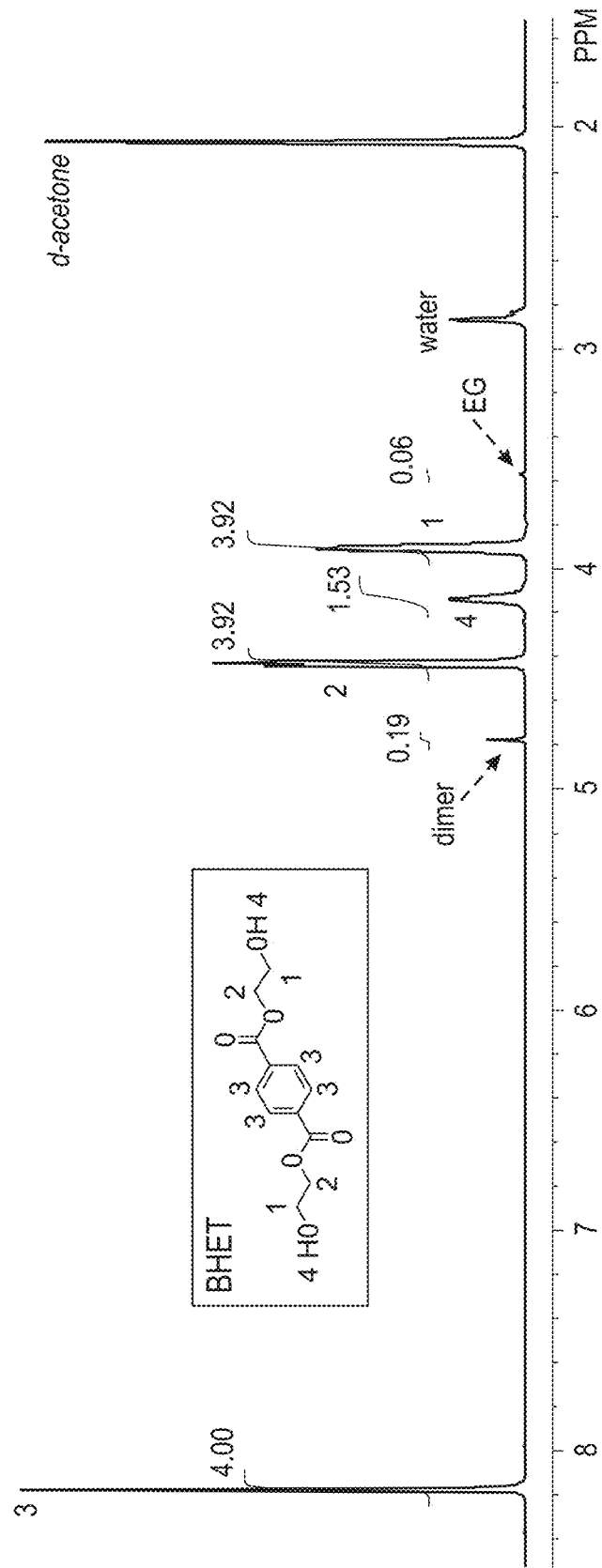

The graphs of FIGS. 2A and 2B show the HPLC and H-NMR analytic results, respectively, of the BHET monomer product obtained from the depolymerization of the polyester portion of the fabric of Example 1. The HPLC and H-NMR results show the BHET monomer product along with a small amount of its dimer (<5% M) as well as a small amount of residual EG, the latter of which is shown in the H-NMR spectrum.

Figure 3:
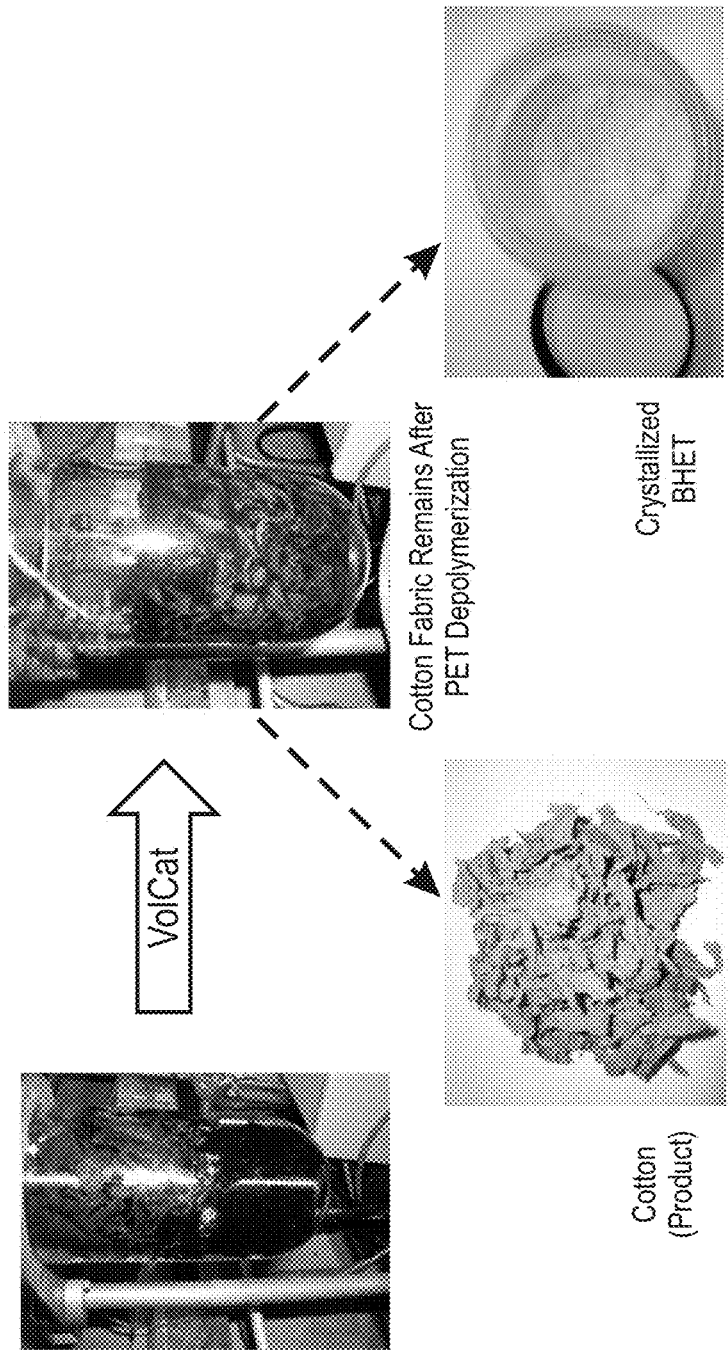
FIG. 3 are photographs showing the results of VolCat depolymerization of a black 50/50 cotton/polyester fabric sample into a neutral-colored polyester-free cotton product and crystallized BHET (Example 2).

The photographs in FIG. 3 show that application of the VolCat process on a black fabric of 50/50 cotton/polyester results in complete depolymerization of PET, recovery of a neutral-colored polyester-free cotton fabric product, and crystallized BHET monomer product (Example 2).

Figure 4:
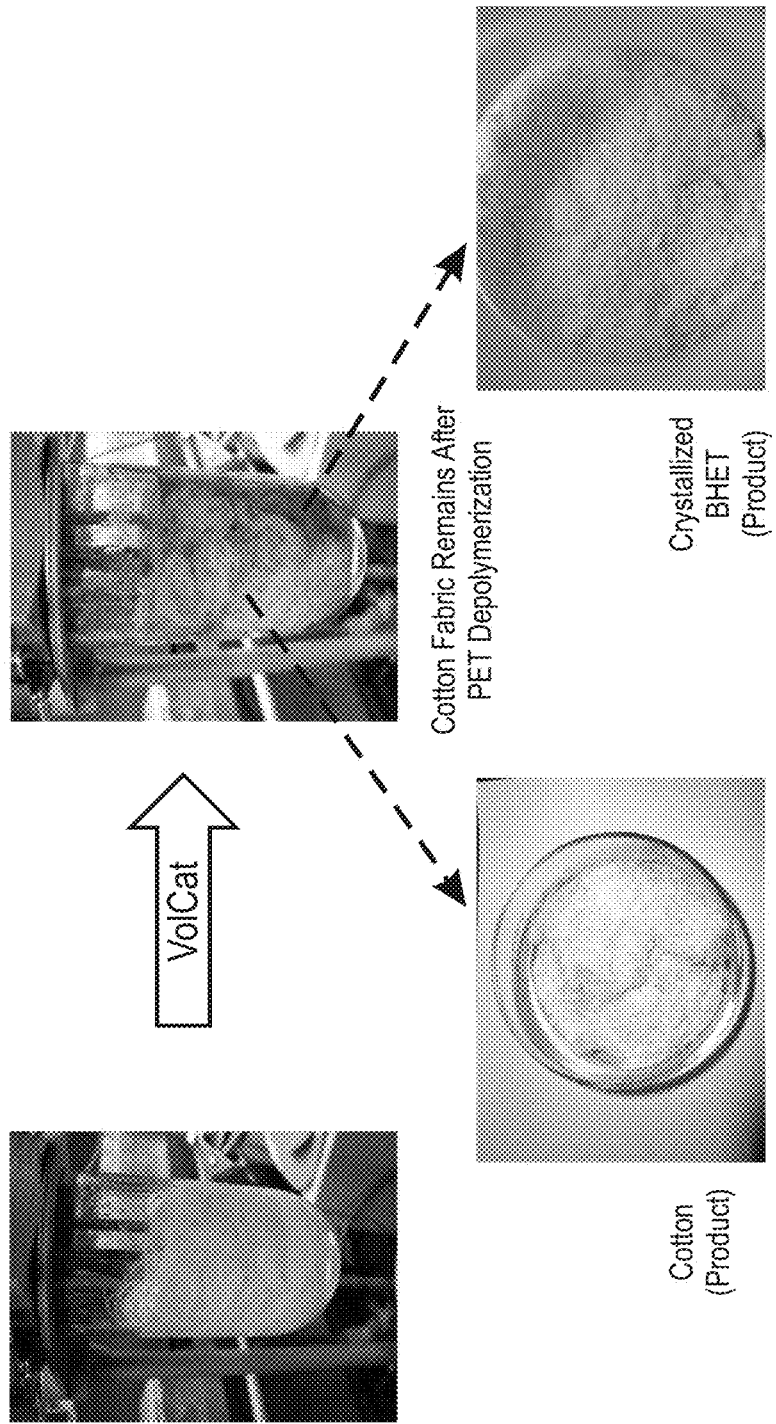
FIG. 4 are photographs showing the results of VolCat depolymerization of a white 52/48 cotton/polyester yarn sample into a white polyester-free cotton product and crystallized BHET (Example 3).

The photographs in FIG. 4 show that application of the VolCat process on a white 52/48 cotton/polyester yarn sample results in complete depolymerization of PET, recovery of a white polyester-free cotton yarn product, and crystallized BHET monomer product (Example 3).

Figure 5:
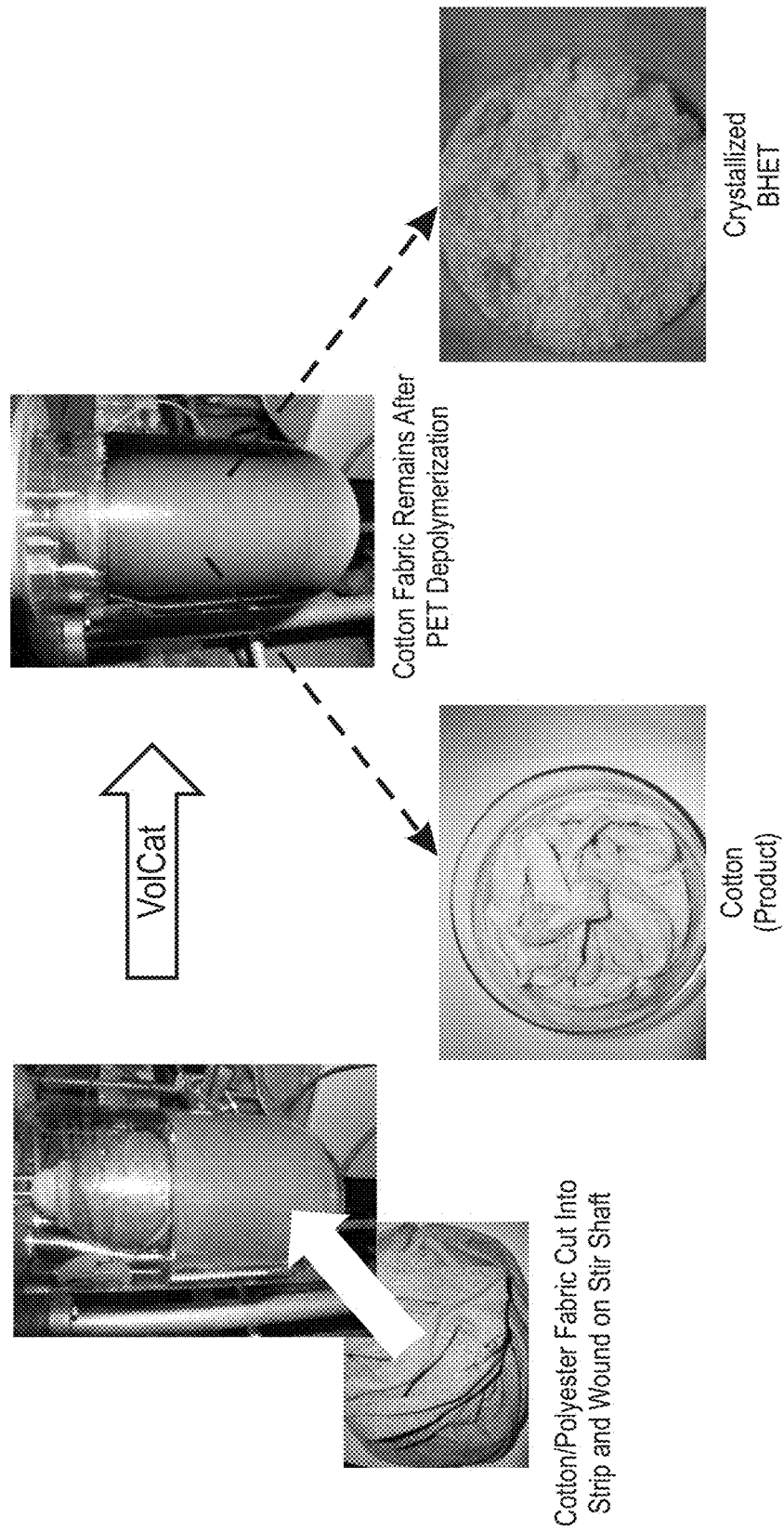
FIG. 5 are photographs showing the results of VolCat depolymerization of a gray 52/48 cotton/polyester fabric sample into a light neutral-color polyester-free cotton product and crystallized BHET (Example 4).

The photographs in FIG. 5 show that application of the VolCat process on a gray 52/48 cotton/polyester fabric sample results in complete depolymerization of PET, recovery of a light neutral-color polyester-free cotton fabric product, and crystallized BHET monomer product (Example 4).

The fiber strength graphs of FIG. 6 show the elongation-to-break of individual cotton fibers from a white 52/48 cotton/polyester yarn sample (Example 3) prior to VolCat depolymerization (top graph) and after recovery from the VolCat process (bottom graph). The before-and-after fiber strength graphs show that the cotton fibers before and after the VolCat process are indistinguishable; consequently, the yarn fibers recovered from the VolCat process may be reused as recycled yarn.

FIG. 7 shows 500× micrographs of the white 52/48 cotton/polyester yarn fiber bundle of Example 3 before VolCat depolymerization (top panels) and the recovered cotton fibers remaining after VolCat depolymerization (bottom panels). The characteristic convolutions in the cotton fibers are apparent both before and after processing. With reference to the pre-process micrographs, the inset in the top center panel shows the cylindrical shape of a polyester fiber. By contrast, in the post-process micrographs, the polyester fibers are completely dissolved away from the cotton, the cotton fibers have no polymer residue on their surface, and there is no evidence of chemical degradation, such as ballooning or fiber wall damage, to the post-process cotton fibers. With reference to the micrographs in the third column, the yarn in the pre-process and post-process panels were dyed with an acid blue dye mixture to selectively visualize the cotton fibers from the polyester. The yarn in the post-process micrograph panel shows an absence of polyester fibers, an absence of polyester coating on the cotton fibers, and uniform coloration to the recovered polyester-free cotton yarn fibers.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following Examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be considered. Unless indicated otherwise, parts are parts by weight, and temperature is degrees centigrade. In the Examples that follow, pressure is measured following the heating of the stated components in a sealed reactor and brought to temperature, such pressure readings being typically (but not necessarily) in the range of 50 psig. All components were obtained commercially unless otherwise indicated.

Example 1

Recovery of Cotton from a Garneted White ~2.4/97.6 Cotton/Polyester Fiber Sample With reference to FIG. 1, 25 g of garneted white ~2.4/97.6 cotton/polyester fibers were combined with 126 g of EG and 0.7 g of TEA, sealed in a 450 mL glass Parr reactor, and heated to 220-230° C. for 1 hour to assure completion of reaction. The reaction was then cooled to 90° C., filtered to recover the cotton and the solution (146 g) was allowed to cool. After cooling, the formed BHET crystals were vacuum filtered from the liquid and dried first by use of a dental dam to compress the crystal bed followed by a water rinse and drying in a vacuum oven at 65° C. The cotton was rinsed with acetone to recover additional BHET and dried. After drying, 2.4 g of additional BHET and 0.6 g (2.4%) cotton were recovered. A total of 26.8 g (81.1%) of BHET was recovered along with 83.5 g of mother liquor (EG and remaining BHET). The HPLC and H-NMR analytic results of the BHET monomer product obtained from the depolymerization of the polyester portion of the fabric are shown in FIGS. 2A (HPLC) and 2B (H-NMR).

Example 2

Recovery of Cotton from a Black 50/50 Cotton/Polyester Fabric Sample

With reference to FIG. 3, 50 g of a black-colored 50/50 cotton/polyester fabric was cut into roughly 1-2-inch shards. The fabric was combined with 250 g of EG and 1.2 g of TEA, sealed in a 450 mL glass Parr reactor, and heated to 220-230° C. for 1 hour to assure completion of reaction. The reaction was then cooled to 90° C., filtered to recover the cotton, and the solution was treated with 10 g of activated carbon for 30 minutes before filtering through a small bed of diatomaceous earth and then allowed to cool. After cooling, the formed BHET crystals were vacuum filtered from the mother liquor and dried first by use of a dental dam to compress the crystal bed followed by a water rinse and drying in a vacuum oven at 65° C. The recovered cotton fabric was rinsed with acetone and then water to recover additional BHET and dried. BHET and cotton were recovered along with the mother liquor (EG and remaining BHET).

Example 3

Recovery of Cotton from a White 52/48 Cotton/Polyester Yarn Sample

With reference to FIG. 4, 25 g of a white 52/48 cotton/polyester yarn was cut to approximately 2.5-inch lengths, combined with 250 g of EG and 2.6 g of TEA, sealed in a 450 mL glass Parr reactor, and heated to 220° C. for 1 hour to assure completion of the reaction. The reaction was then cooled to 90° C., filtered to recover the cotton, and the solution allowed to cool. After cooling, the formed BHET crystals were vacuum filtered from the mother liquor and dried first by use of a dental dam to compress the crystal bed followed by a water rinse and drying in a vacuum oven at 65° C. The recovered cotton fibers were rinsed with acetone and then water to recover additional BHET and dried. BHET and 11.8 g cotton were recovered along with the mother liquor (EG and remaining BHET). FIG. 6 shows the results of the elongation-to-break fiber strength test and FIG. 7 shows micrograph images of the cotton/polyester yarn fibers before the depolymerization reaction (top panels) and the polyester-free cotton yarn fibers after the completion of the depolymerization reaction (bottom panels).

Example 4

Recovery of Cotton from a Gray 52/48 Cotton/Polyester Fabric Sample

With reference to FIG. 5, 50 g of a grey-colored 52/48 cotton/polyester fabric was cut into a 2.5-inch-wide strip and wound around a stirring shaft of a 450 mL glass Parr reactor. 250 g of EG and 2.6 g of TEA were added to the reactor to which the stir shaft and fabric were lowered. The reactor was sealed and heated to 220° C. for 1 hour to assure completion of reaction. The reactor contents were then cooled to 90° C. and the fabric was squeezed to remove most of the absorbed liquid. After cooling, the BHET crystals were filtered from the liquid, rinsed with a small amount of cold ethylene glycol followed by water and then sucked dry. The recovered cotton was rinsed with DI water and dried overnight using vacuum through a filter funnel after first compressing the cotton by the use of a dental dam to remove excess water. The recovered BHET product crystals and the fabric were dried further in a 65° C. vacuum oven for 4 hours. BHET and 25.6 g of cotton were recovered along with the mother liquor (EG and remaining BHET).

We claim:

1. A method comprising:
    placing garneted cotton/polyester fabric in a reaction vessel of a pressure reactor with an amine organocatalyst and/or carboxylic acid salt and an alcohol solvent and heating the reaction vessel to run the reaction;
    recovering from the reaction vessel (i) polyester-free cotton as a solid inert by-product of the reaction, (ii) the amine organocatalyst and/or carboxylic acid salt of same for reuse, (iii) a polyester monomer product, and (iv) unreacted alcohol solvent; and
    purifying the recovered polyester-free cotton with a liquid selected from the group consisting of alcohol, acetone, water, and combinations thereof.

2. The method of claim 1, wherein the pressure reactor is an autoclave.

3. The method of claim 1, wherein the pressure reactor is an extrusion reactor.

4. The method of claim 1, wherein the polyester-free cotton is purified with alcohol, wherein the alcohol is the unreacted alcohol solvent recovered from the reaction vessel.

5. The method of claim 1, wherein the method is run in batches.

6. The method of claim 1, wherein the method is run as a continuous flow process.

7. The method of claim 1, wherein the polyester is selected from the group consisting of polyethylene terephthalate (PET), polyethylene naphthalate (PEN), polybutylene terephthalate (PBT), polytrimethylene terephthalate (PTI), polyethylene furanoate (PEF), and combinations thereof.

8. The method of claim 1, wherein the amine organocatalyst and/or carboxylic acid salt of same is selected from the group consisting of triethylamine (TEA), tetramethylethylenediamine (TMEDA), pentamethyldiethylenetriamine (PMDETA), trimethyl triaza cyclononane (TACN), 4-(N,N-dimethylamino) pyridine (DMAP), 1,4-diazabicyclo [2.2.2] octane (DABCO), N-methyl imidazole (NMI), and combinations thereof.

9. The method of claim 1, wherein the alcohol solvent is a glycol and/or a diol.

10. The method of claim 1, wherein the garneted cotton/polyester fabric is a colored fabric and the recovered polyester-free cotton neutral and/or white reusable cotton.

11. A method comprising:
    placing a garneted cotton/polyester fabric in a reaction vessel of a non-pressurized chemical reactor with an amine organocatalyst and/or carboxylic acid salt and an alcohol solvent and heating the reaction vessel to run the reaction;
    recovering from the reaction vessel (i) polyester-free cotton as a solid inert by-product of the reaction, (ii) the amine organocatalyst and/or carboxylic acid salt of same for reuse, (iii) a polyester monomer product, and (iv) unreacted alcohol solvent; and
    purifying the recovered polyester-free cotton with a liquid selected from the group consisting of alcohol, acetone, water, and combinations thereof.

12. The method of claim 11, wherein the non-pressurized reactor is a round-bottom flask.

13. The method of claim 11, wherein the polyester-free cotton is purified with alcohol, wherein the alcohol is the unreacted alcohol solvent recovered from the reaction vessel.

14. The method of claim 11, wherein the method is run in batches.

15. The method of claim 11, wherein the method is run as a continuous flow process.

16. The method of claim 11, wherein the polyester is selected from the group consisting of polyethylene terephthalate (PET), polyethylene naphthalate (PEN), polybutylene terephthalate (PBT), polytrimethylene terephthalate (PTI), polyethylene furanoate (PEF), and combinations thereof.

17. The method of claim 11, wherein the amine organocatalyst and/or carboxylic acid salt of same is selected from the group consisting of triethylamine (TEA), tetramethylethylenediamine (TMEDA), pentamethyldiethylenetriamine (PMDETA), trimethyl triaza cyclononane (TACN), 4-(N,N-dimethylamino) pyridine (DMAP), 1,4-diazabicyclo [2.2.2] octane (DABCO), N-methyl imidazole (NMI), and combinations thereof.

18. The method of claim 11, wherein the alcohol solvent is a glycol and/or a diol.

19. The method of claim 11, wherein the garneted cotton/polyester fabric is a colored fabric and the recovered polyester-free cotton neutral and/or white reusable cotton.

\* \* \* \* \*